United States Patent
Seo et al.

(10) Patent No.: US 11,024,912 B2
(45) Date of Patent: Jun. 1, 2021

(54) METHOD OF SEALING SIDE PORTION OF POUCH-SHAPED BATTERY INCLUDING TWO-STEP SEALING PROCESS

(71) Applicant: LG Chem, Ltd., Seoul (KR)

(72) Inventors: Tai Joon Seo, Daejeon (KR); Ki Eun Sung, Daejeon (KR)

(73) Assignee: LG Chem, Ltd.

( * ) Notice: Subject to any disclaimer, the term of this patent is extended or adjusted under 35 U.S.C. 154(b) by 139 days.

(21) Appl. No.: 16/480,935

(22) PCT Filed: Aug. 14, 2018

(86) PCT No.: PCT/KR2018/009360
§ 371 (c)(1),
(2) Date: Jul. 25, 2019

(87) PCT Pub. No.: WO2019/045329
PCT Pub. Date: Mar. 7, 2019

(65) Prior Publication Data
US 2019/0393455 A1 Dec. 26, 2019

(30) Foreign Application Priority Data
Aug. 29, 2017 (KR) .................. 10-2017-0109719

(51) Int. Cl.
*H01M 50/183* (2021.01)
*H01M 10/04* (2006.01)
(Continued)

(52) U.S. Cl.
CPC ........... *H01M 50/183* (2021.01); *B29C 65/02* (2013.01); *H01M 10/04* (2013.01); *H01M 50/10* (2021.01)

(58) Field of Classification Search
CPC .................................................. H01M 50/183
See application file for complete search history.

(56) References Cited

U.S. PATENT DOCUMENTS

2011/0091766 A1* 4/2011 Kim .................... H01M 50/543
429/176
2011/0183182 A1 7/2011 Woehrle et al.
(Continued)

FOREIGN PATENT DOCUMENTS

CN 101573811 A 11/2009
CN 202687165 U 1/2013
(Continued)

OTHER PUBLICATIONS

International Search Report for Application No. PCT/KR2018/009360 dated Nov. 22, 2018, pp. 1-2.
(Continued)

*Primary Examiner* — Brian R Ohara
(74) *Attorney, Agent, or Firm* — Lerner, David, Littenberg, Krumholz & Mentlik, LLP

(57) ABSTRACT

Disclosed herein is a method of sealing a side portion of a pouch-shaped battery including an electrode current collector and a pouch-shaped battery case, the method including bending a lower case and an upper case connected to the lower case such that the upper case faces the lower case and the electrode current collector is disposed in the lower case, the lower case and the upper case being connected to one another at a bent portion of the pouch-shaped battery case, a primary sealing step of sealing the lower end part of the side portion of the pouch-shaped battery case adjacent to the bent portion of the pouch-shaped battery case, and a secondary sealing step of sealing the entirety of the side portion of the pouch-shaped battery case.

10 Claims, 6 Drawing Sheets

(51) Int. Cl.
H01M 50/10 (2021.01)
B29C 65/02 (2006.01)

(56) References Cited

U.S. PATENT DOCUMENTS

| | | |
|---|---|---|
| 2013/0052521 A1 | 2/2013 | Kim |
| 2017/0012252 A1 | 1/2017 | Yoo et al. |
| 2018/0219245 A1 | 8/2018 | Choi et al. |
| 2020/0067029 A1 | 2/2020 | Park et al. |

FOREIGN PATENT DOCUMENTS

| | | |
|---|---|---|
| CN | 103427108 A | 12/2013 |
| EP | 3537497 A1 | 9/2019 |
| JP | 2001060452 A | 3/2001 |
| JP | 2001084970 A | 3/2001 |
| JP | 2001126683 A | 5/2001 |
| JP | 2001202931 A | 7/2001 |
| JP | 2004303589 A | 10/2004 |
| JP | 2007200589 A | 8/2007 |
| JP | 2011086608 A | 4/2011 |
| JP | 2012064459 A | 3/2012 |
| KR | 20120102935 A | 9/2012 |
| KR | 20140041057 A | 4/2014 |
| KR | 101471765 B1 | 12/2014 |
| KR | 20150101551 A | 9/2015 |
| KR | 20160088647 A | 7/2016 |
| KR | 20170020996 A | 2/2017 |
| KR | 20170052061 A | 5/2017 |
| KR | 20170057598 A | 5/2017 |
| KR | 20180107461 A | 10/2018 |

OTHER PUBLICATIONS

Extended European Search Report including Written Opinion for Application No. EP18849873.7 dated Jun. 15, 2020, 7 pgs.

* cited by examiner

[FIG. 1]
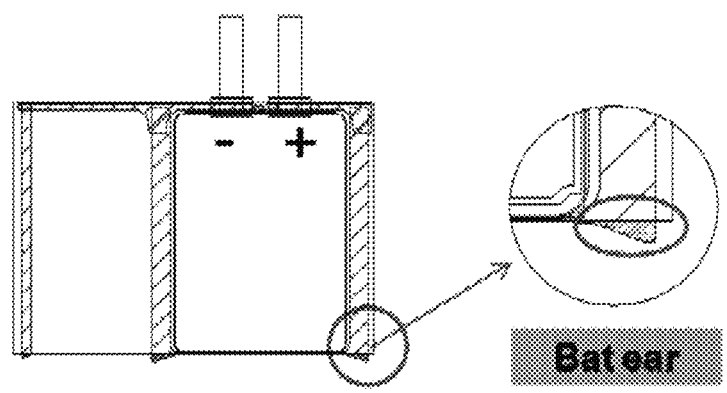

[FIG. 2]
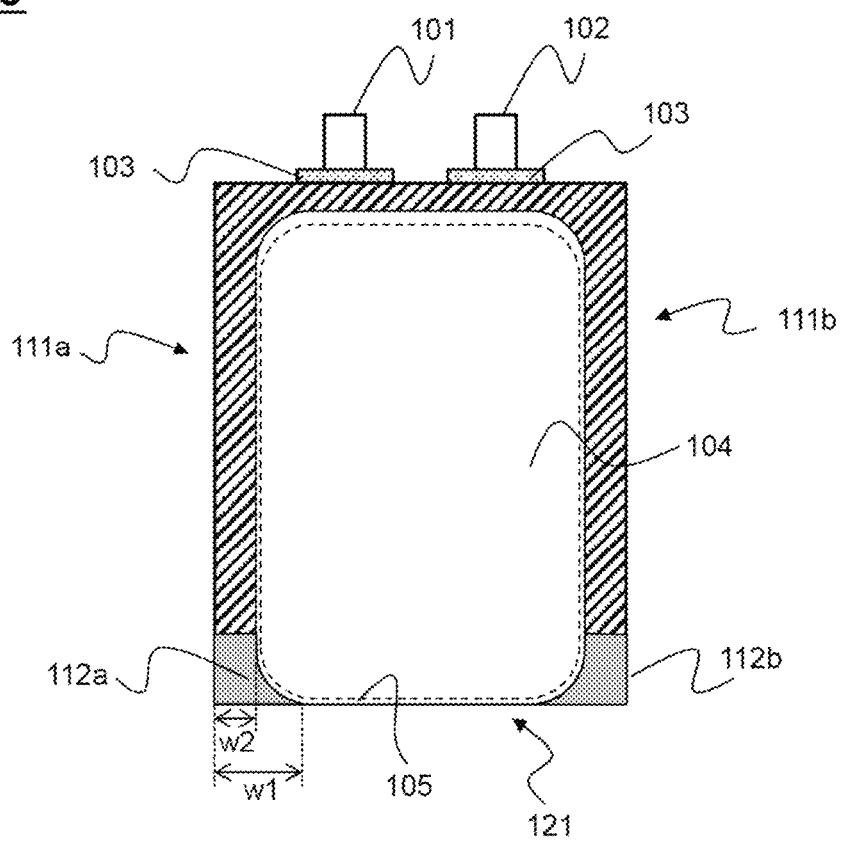

[FIG. 3]
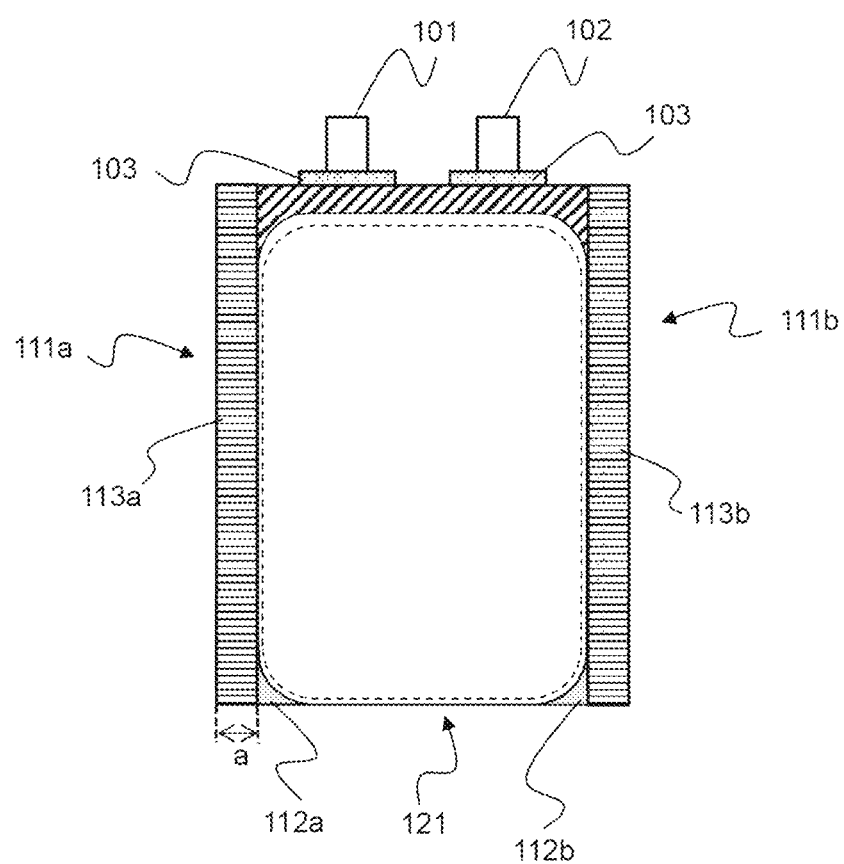

[FIG. 4]
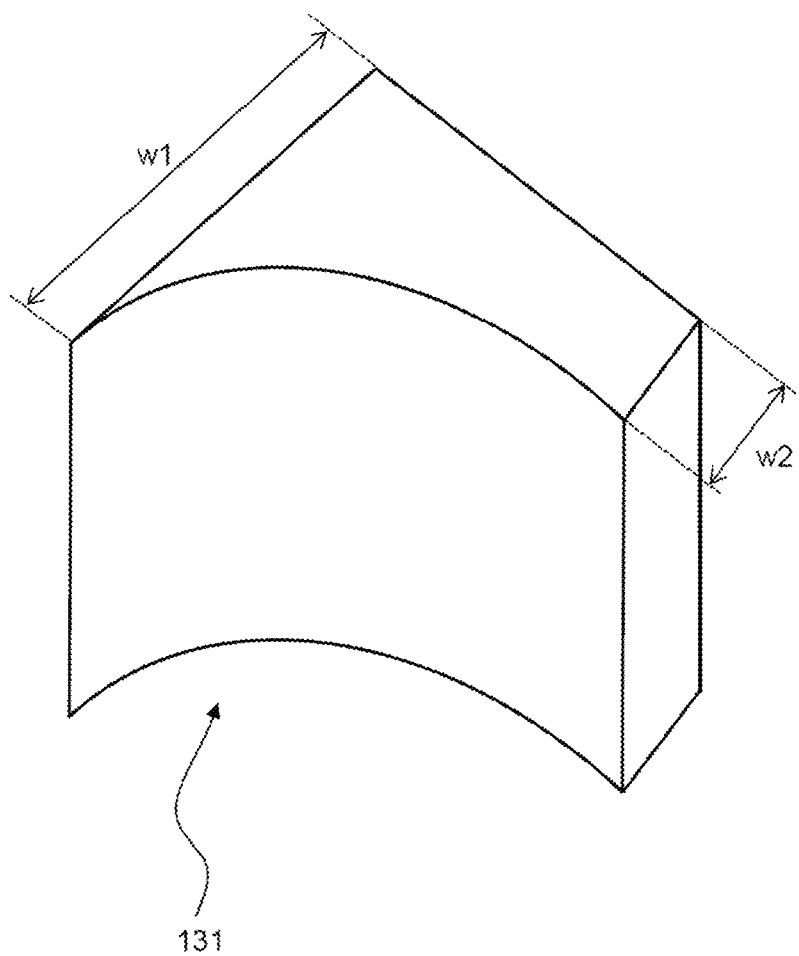

[FIG. 5]
113
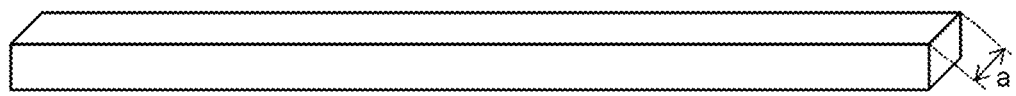
[FIG. 6]
210
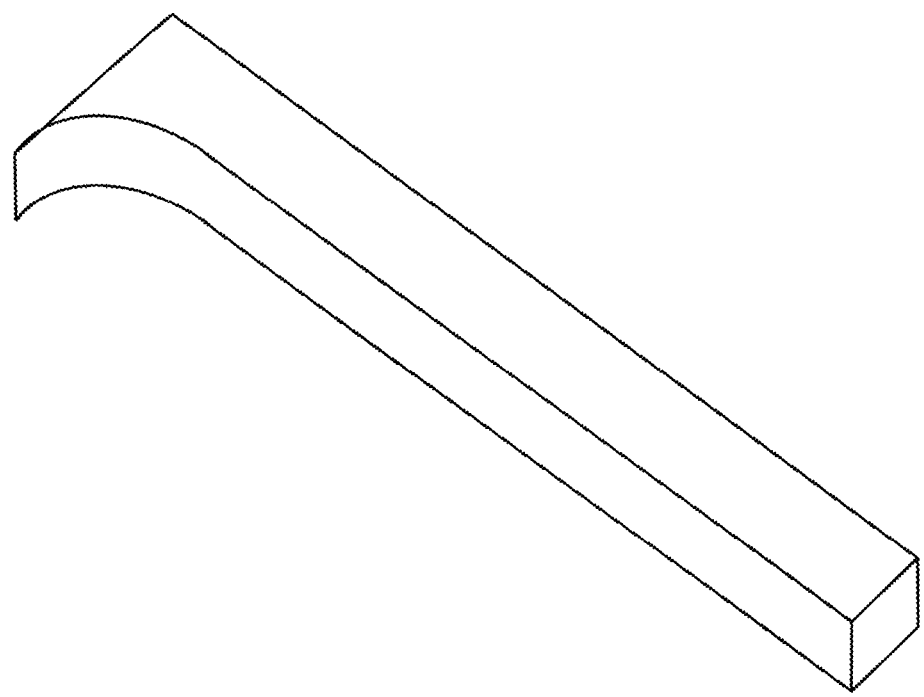

【FIG. 7】
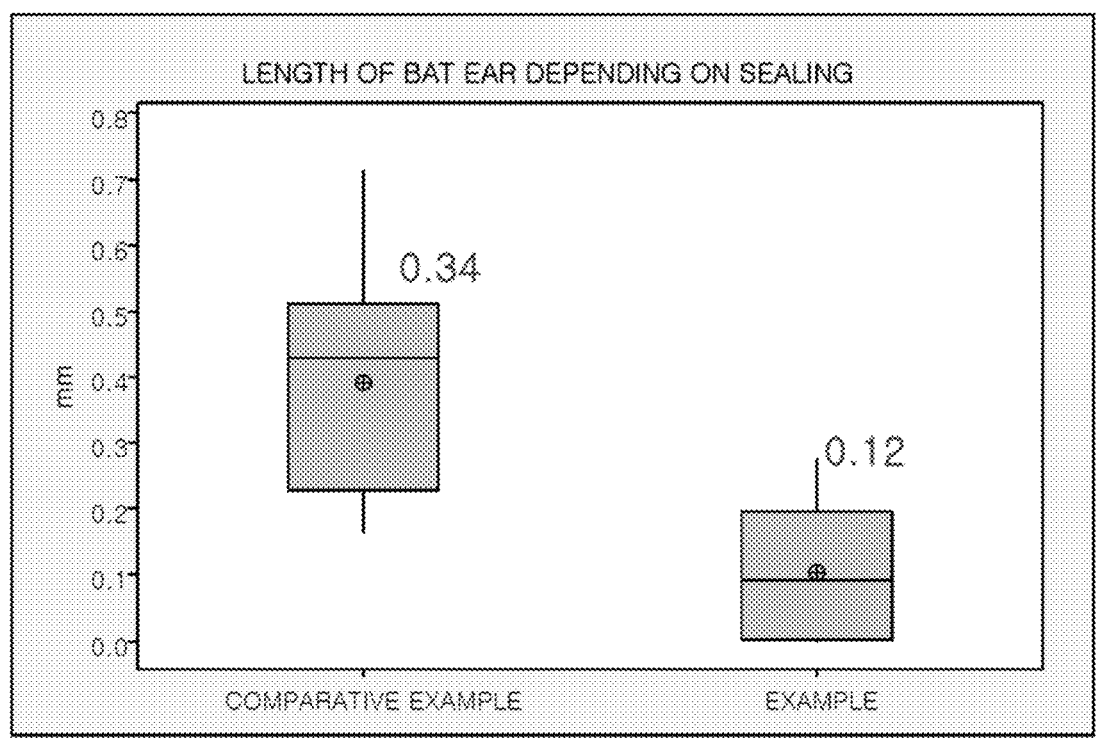

METHOD OF SEALING SIDE PORTION OF POUCH-SHAPED BATTERY INCLUDING TWO-STEP SEALING PROCESS

CROSS-REFERENCE TO RELATED APPLICATIONS

This application is a national phase entry under 35 U.S.C. § 371 of International Patent Application No. PCT/KR2018/009360, filed on Aug. 14, 2018, published in Korean, which claims the benefit of the filing date of Korean Patent Application No. 10-2017-0109719, filed on Aug. 29, 2017, the disclosures of which are hereby incorporated by reference herein in their entireties.

TECHNICAL FIELD

The present invention relates to a method of sealing a side portion of a pouch-shaped battery including a two-step sealing process, and more particularly to a method of sealing a side portion of a pouch-shaped battery including a primary sealing step of bending an upper case and a lower case, which are connected to each other, and sealing the lower end part of a side portion of the battery case adjacent to a bent portion of the battery case and a secondary sealing step of sealing the entirety of the side portion of the battery case.

BACKGROUND ART

Lithium secondary batteries may be classified into a cylindrical battery, a prismatic battery, and a pouch-shaped battery based on the shape of a battery case. Each of the cylindrical battery and the prismatic battery is a battery that is configured to have a structure in which an electrode assembly is mounted in a metal can. The pouch-shaped battery is a battery that is generally configured to have a structure in which an electrode assembly is mounted in a pouch-shaped battery case made of an aluminum laminate sheet. Among these batteries, the pouch-shaped battery, which can be stacked with high integration, has high energy density per unit weight, is inexpensive, and can be easily modified, has attracted considerable attention in recent years.

The pouch-shaped battery may include two separable battery cases or a single battery case made of a laminate sheet, which is configured to be bent.

In general, a thermal-fusion sealing process is performed in order to seal a pouch-shaped battery cell. In the case in which a battery case is constituted by two separable members, the outer edge of an electrode assembly reception unit is uniformly thermally fused, whereby a problem in which a sealed portion is pushed out does not occur.

In the case in which a pouch-shaped battery cell includes a battery case constituted by a single member including a bent portion, a sealant layer is pushed toward the bent portion when a side portion of the battery case adjacent to the bent portion is sealed, whereby the sealant layer accumulates at the bent portion. As a result, the sealant layer may be pushed out of the bent portion. The part of the sealant that is pushed out of the bent portion is referred to as a bat ear, since the pushed part resembles the bat's ear.

In the case in which the bat ear is formed, the length of the battery cell, including the bat ear, is measured at the time of measuring the overall length of the battery cell. Consequently, the measured length of the battery cell is greater than the actual length of the battery cell. As a result, a portion of the measured length of the battery cell is useless.

That is, it is necessary to reduce the actual length of the battery cell in proportion to the increase in the length of the battery cell, whereby the capacity of the battery cell is reduced.

Various attempts have been made in order to prevent an increase in the length of a sealed portion of a battery case at the time of sealing a pouch-shaped battery cell and thus to prevent a reduction in the capacity of the pouch-shaped battery cell.

For example, Korean Patent Application Publication No. 2016-0088647 discloses a process of bending a member for forming a pouch-shaped battery case along the middle horizontal axis thereof to form a pouch-shaped battery case and sealing the bent end to form a surplus sealed portion.

The above publication discloses technology that is capable of prevent the formation of wrinkles by further sealing the entirety of the bent end. However, this publication does not disclose technology that is capable of increasing the overall length of a battery cell without sealing the bent portion. In the case in which the entirety of the bent end is further sealed, as described above, the volume of the battery cell is reduced in proportion thereto. Consequently, the invention disclosed in this publication has no merits over the conventional art.

As other examples of the conventional art, Japanese Patent Application Publication No. 2001-202931 discloses a pouch-shaped battery cell configured to have a structure in which four sides of the outer edge of an electrode assembly reception unit are sealed by thermal fusion and in which corners of the outer edge of an electrode assembly reception unit are bent obliquely, Korean Patent Application Publication No. 2015-0101551 discloses a pouch-shaped secondary battery including a sealing line formed in order to easily bend a sealed portion, and Korean Patent Application Publication No. 2017-0020996 discloses a structure in which a sealed portion is formed so as to be adjacent to an outer boundary at which an electrode tab-lead coupling portion is formed. However, these publications do not disclose technology that is capable of preventing an increase in the overall length of the battery cell.

Therefore, there is an urgent necessity for technology that is capable of preventing an increase in the measured overall length of a pouch-shaped secondary battery, including a battery case constituted by a single member having a bent portion formed at one side of the outer edge of the battery case, due to an increase in the length of a sealed portion in the vicinity of the bent portion.

DISCLOSURE

Technical Problem

The present invention has been made in view of the above problems and other technical problems that have yet to be resolved, and it is an object of the present invention to provide a method of sealing a side portion of a pouch-shaped battery including a primary sealing step and a secondary sealing step, wherein the part of a side portion that is adjacent to a bent portion is sealed at the primary sealing step and wherein the entirety of the side portion is sealed at the secondary sealing step, whereby it is possible to prevent the part of the side portion that is adjacent to the bent portion from being pushed out and to prevent cracks from being formed at the outer edge of an electrode assembly reception unit.

In the case in which the part of the side portion that is adjacent to the bent portion is prevented from being pushed out, as described above, no bat ear is formed. Consequently, it is possible to precisely measure the overall length of a battery cell, whereby it is possible to prevent a reduction in the capacity of the battery cell.

Technical Solution

In accordance with an aspect of the present invention, the above and other objects can be accomplished by the provision of a method of sealing a side portion of a pouch-shaped battery including an electrode current collector and a pouch-shaped battery case, the method including bending a lower case and an upper case connected to the lower case such that the upper case faces the lower case and the electrode current collector is disposed in the lower case, the lower case and the upper case being connected to one another at a bent portion of the pouch-shaped battery case, a primary sealing step of sealing the lower end part of the side portion of the pouch-shaped battery case adjacent to the bent portion of the pouch-shaped battery case, and a secondary sealing step of sealing the entirety of the side portion of the pouch-shaped battery case.

Specifically, the pouch-shaped battery according to the present invention includes a battery case configured to have a structure in which an upper case and a lower case, which are connected to each other, are bent and sealed. A positive electrode terminal and a negative electrode terminal protrude from the battery case in the same direction. The positive electrode terminal and the negative electrode terminal may protrude in a direction opposite the direction in which a bent portion is formed at the battery case.

In the case in which the upper case and the lower case are bent and sealed to constitute a battery case, as described above, at the time of sealing a side portion of the battery case, the sealed portion of the battery case is pushed. As a result, the sealed portion adjacent to the bent portion is pushed out of the bent portion.

The reason for this is that the entirety of the side portion is sealed through a single heating and pressing process in order to seal the pouch-shaped secondary battery. When the portions of the upper case and the lower case that face each other are sealed, therefore, the ends of the side portions adjacent to the bent portion are pushed out of the bent portion in the state in which the ends of the side portions opposite the bent portion are aligned with each other.

As described above, the lower end part of the side portion that is adjacent to the bent portion is sealed at the primary sealing step, and the entirety of the side portion is sealed at the secondary sealing step. At the primary sealing step, the lower end part of the side portion that is adjacent to the bent portion is heated and pressed first, whereby a sealant layer of the upper case and a sealant layer of the lower case are fused to each other. Consequently, a phenomenon in which the side portion is pushed out of the bent portion is remarkably reduced.

In addition, the secondary sealing step, at which the entirety of the side portion is sealed, is performed after the primary sealing step. Consequently, it is possible to seal the outer edge of the electrode assembly reception unit, including the side of the outer edge of the electrode assembly reception unit from which the electrode terminals protrude.

For example, the length of the lower end part of the side portion sealed at the primary sealing step may be 30% or less of the overall length of the side portion. Preferably, the length of the lower end part of the side portion is 10% or less of the overall length of the side portion.

In the case in which the length of the lower end part of the side portion is greater than 30% of the overall length of the side portion, the sealant layer may be moved toward the lower end part of the side portion, whereby it is difficult to prevent the side portion from being pushed out of the bent portion, which is undesirable. In the case in which the length of the lower end part of the side portion is less than 10% of the overall length of the side portion, the lower end part of the side portion may not be reliably sealed, which is also undesirable.

In a concrete example, the sequence of sealing the side portions of the pouch-shaped case may be set in consideration of the position of an electrolytic solution injection port in the pouch-shaped battery and an electrolytic solution injection step. The opposite side portions of the pouch-shaped case may be sealed simultaneously. Alternatively, one side portion of the pouch-shaped case may be primarily and secondarily sealed, and then the other side portion of the pouch-shaped case may be primarily and secondarily sealed.

The lower end part of the side portion sealed at the primary sealing step may have the following shape. Specifically, a first surface of the lower end part sealed during the primary sealing step may correspond to the boundary of a reception unit, in which the electrode current collector is mounted and a second surface of the lower end part may correspond to the outer surface of the pouch-shaped battery case, and a lower end of the lower end part, which is adjacent to the bent portion, is wider than an upper end of the lower end part.

A first surface of the lower end part that corresponds to the boundary of the electrode assembly reception unit may be formed at the lower end of the side portion that faces the electrode assembly reception unit, and a second surface of the lower end part may be formed so as to correspond to the outer surface of the pouch-shaped battery case, or may be somewhat pushed out of the outer surface of the pouch-shaped battery case. Consequently, the lower end of the lower end part may be longer in a direction parallel to the bent portion than the upper end of the lower end part.

In consideration of the fact that the inner sealant layer of the pouch-shaped battery case is made of a thermoplastic material, which melts at a higher temperature, the sealing may be performed by thermal fusion under pressure.

At the primary sealing step, sealing is performed using a sealing block having a shape corresponding to the shape of the electrode assembly reception unit. Specifically, a sealing block provided with a curved surface having a radius of curvature corresponding to that of a curved corner of the electrode assembly reception unit may be used for the corner of the electrode assembly reception unit. Consequently, the length of the sealed portion extending toward the electrode assembly reception unit in the direction parallel to the bent portion is gradually increased from the side portion to the bent portion. In addition, at the secondary sealing step, the entirety of the side portion is thermally fused using a sealing block having an approximately rectangular parallelepiped shape.

In addition, the side portion may be thermally fused in the state in which the outer end of the lower end part of the side portion is approximately aligned with the outer end of the side portion. The lower length of the lower end part adjacent to the bent portion that is sealed during the primary sealing step may be greater than the lower length of the sealed side portion adjacent to the bent portion that is sealed during the secondary sealing step.

Since the battery case is configured to have a structure in which the upper case and the lower case are bent in the state in which the upper case and the lower case are connected to each other, the electrode terminal may include a positive electrode terminal and a negative electrode terminal that are oriented in the same direction. Preferably, the positive electrode terminal and the negative electrode terminal are located at an upper end part of the pouch-shaped battery case opposite the bent portion.

In a concrete example, the primary sealing step may be performed using a sealing block having a planar shape corresponding to a planar shape of the lower end part in order to form the same shape as the lower end part of the side portion at the pouch-shaped battery.

In addition, a sealed portion having a rectangular structure, in which the major-axis length of the sealed portion is greater than the minor-axis length of the sealed portion when viewed in a plan view, may be formed along the entirety of the side portion of the pouch-shaped battery. The secondary sealing step may be performed using a sealing block having a planar shape corresponding to a planar shape of the side portion.

In the method of sealing the side portion of the pouch-shaped battery according to the present invention, as described above, the sealing block used at the primary sealing step and the sealing block used at the secondary sealing step are different from each other in terms of the shape thereof.

At the primary sealing step, the lower end part of the side portion, which is adjacent to the bent portion, is sealed. As needed, however, the upper end part of the side portion, which is far away from the bent portion, may be sealed simultaneously therewith. The sealing of the upper end part may be performed in a manner exactly symmetrical with the sealing of the lower end part, which is adjacent to the bent portion. In accordance with other aspects of the present invention, there are provided a pouch-shaped battery sealed using the method of sealing the side portions of the pouch-shaped battery and a battery pack including the pouch-shaped battery.

In the pouch-shaped battery, a bat ear portion of the pouch-shaped battery case extending from the bent portion may have a length ranging from 0.01 mm to 0.2 mm. Since the portion that is pushed out from the sealed portion is relatively small, it is possible to minimize waste related to the battery cell due to an increase in the measured size of the battery cell.

Specifically, the battery pack may be used as a power source for a device requiring the ability to withstand high temperatures, a long lifespan, high rate characteristics, etc. Specific examples of the device may include a mobile electronic device, a wearable electronic device, a power tool driven by a battery-powered motor, an electric automobile, such as an electric vehicle (EV), a hybrid electric vehicle (HEV), or a plug-in hybrid electric vehicle (PHEV), an electric two-wheeled vehicle, such as an electric bicycle (E-bike) or an electric scooter (E-scooter), an electric golf cart, and an energy storage system. However, the present invention is not limited thereto.

The structure and manufacturing method of the device are well known in the art to which the present invention pertains, and thus a detailed description thereof will be omitted.

BRIEF DESCRIPTION OF DRAWINGS

FIG. 1 is a schematic view showing a bat ear formed when a conventional method is used.

FIG. 2 is a plan view showing a pouch-shaped battery primarily sealed in accordance with an embodiment of the present invention.

FIG. 3 is a plan view showing a pouch-shaped battery secondarily sealed after being primarily sealed as shown in FIG. 2.

FIG. 4 is a perspective view showing a sealing block used in the primary sealing process performed in FIG. 2.

FIG. 5 is a perspective view showing a sealing block used in the secondary sealing process performed in FIG. 3.

FIG. 6 is a perspective view showing a sealing block used in Comparative Example.

FIG. 7 is a graph showing the experimental results of Example and Comparative Example.

BEST MODE

Now, exemplary embodiments of the present invention will be described in detail with reference to the accompanying drawings. It should be noted, however, that the illustrated embodiments are given for easier understanding of the present invention and thus the scope of the present invention is not limited by the illustrated embodiments.

FIG. 1 is a view showing a bat ear that may be formed when a sealing block shown in FIG. 6 is used in order to perform a conventional method.

FIG. 2 is a plan view schematically showing a pouch-shaped battery primarily sealed in accordance with an embodiment of the present invention, and FIG. 3 is a plan view schematically showing a pouch-shaped battery secondarily sealed after being primarily sealed.

Referring to FIGS. 2 and 3, the pouch-shaped battery, denoted by reference numeral 100, is configured to have a structure in which a positive electrode terminal 101 and a negative electrode terminal 102 protrude upwards from a battery case, in which an electrode assembly reception unit 105 is formed in the middle of the battery case, and in which an electrode assembly 104 is mounted in the electrode assembly reception unit 105. The positive electrode terminal 101 and the negative electrode terminal 102 are sealed in the state in which insulating films 103 are attached to the portions of the positive electrode terminal 101 and the negative electrode terminal 102 that overlap the sealed portion of the battery case in order to increase the force of sealing the electrode terminals and the battery case and to guarantee electrical insulation between the electrode terminals and the battery case.

The pouch-shaped battery 100 includes a lower case, in which the electrode assembly reception unit is formed, and an upper case connected to the lower case, the upper case being located on the upper surface of the lower case in the state of being bent. The battery case is provided at the lower side thereof with a bent portion 121, along which the battery case is bent such that the upper case and the lower case face each other.

A left side portion 111a and a right side portion 111b are formed so as to be adjacent to the outer edge of the battery case from which the electrode terminals protrude. A lower end part 112a of the left side portion 111a and a lower end part 112b of the right side portion 111b are thermally fused through a primary sealing step.

The inside of each of the left lower end part 112a and the right lower end part 112b faces a corresponding corner of the electrode assembly reception unit while having a curved structure corresponding to the shape of the corner of the electrode assembly reception unit. The outside of each of the left lower end part 112a and the right lower end part 112b is aligned with the outer edge of the battery case. The lower end of each of the lower end parts 112a and 112b is connected to the bent portion 121. The lower length w1 of each of the lower end parts 112a and 112b is greater than the upper length w2 of each of the lower end parts 112a and 112b.

The left side portion 111a and the right side portion 111b of the pouch-shaped battery 100 shown in FIG. 2 are secondarily sealed. As a result, each of sealed side portions 113a and 113b is configured to have a rectangular shape when viewed in a plan view and to have a width a corresponding to the width a of a corresponding one of the opposite sealed side portions of the electrode assembly reception unit 105.

FIG. 4 is a perspective view schematically showing a sealing block used in a primary sealing process.

Referring to FIG. 4, the side surface 131 of the sealing block 112 that faces the electrode assembly reception unit is configured to have a curved structure corresponding to the curved surface of a corresponding one of the corners of the electrode assembly reception unit, i.e. a concave structure. The length w1 of the sealing block 112 adjacent to the bent portion when viewed in a plan view is formed so as to gradually increase from the length w2 of the sealing block 112 far away from the bent portion when viewed in a plan view. Consequently, it is possible to prevent the sealed portion of the battery case in the vicinity of the bent portion from being pushed toward the bent portion.

FIG. 5 is a perspective view schematically showing a sealing block used in a secondary sealing process.

Referring to FIG. 5, the sealing block, denoted by reference numeral 113, is configured to have a rectangular shape when viewed in a plan view, more specifically a rectangular parallelepiped shape.

The minor-axis length a of the sealing block 113 is formed so as to have a size corresponding to the width a of each sealed side portion of a pouch-shaped battery 120, and the major-axis length of the sealing block 113 is formed so as to have a size corresponding to the major-axis length of the pouch-shaped battery.

Meanwhile, the upper length w2 of the sealing block 112 and the minor-axis length a of the sealing block 113 may be the same in order to maintain uniform force of sealing of each sealed side portion of the pouch-shaped battery.

Hereinafter, the present invention will be described with reference to the following example. This example is provided only for illustration of the present invention and should not be construed as limiting the scope of the present invention.

EXAMPLE

An electrode assembly, which was configured to have a structure in which electrode terminals protruded from one side thereof, was placed in a lower case having an electrode assembly reception unit formed therein such that the electrode terminals were located in the direction opposite a bent portion of a battery case, and an upper case connected to the lower case was bent so as to face the lower case.

The lower end parts of side portions of the battery case, adjacent to the outer edge of the battery case in the direction in which the electrode terminals protruded, which were connected to the bent portion of the battery case, were primarily sealed using the sealing block 112 of FIG. 4.

Subsequently, the entireties of the side portions of the battery case were secondarily sealed using the sealing block 113 of FIG. 5.

The result of measurement of the length of the part of each side portion of the sealed battery that was pushed out of the bent portion of the battery case is shown in the graph of FIG. 7.

Comparative Example

Side portions of a pouch-shaped battery were sealed in the same manner as in Example except that the side portions were sealed through a single-step process using the sealing block 210 of FIG. 6 in the state in which the wide part of the sealing block was located so as to be adjacent to the bent portion of the battery case.

The result of measurement of the length of the part of each side portion of the sealed battery that was pushed out of the bent portion of the battery case is shown in the graph of FIG. 7.

Referring to FIG. 7, the length of the part (bat ear) of each side portion that was pushed out of the bent portion of the battery case was 0.12 mm in the case in which the sealing method according to Example was used, whereas the length of the part of each side portion that was pushed out of the bent portion of the battery case was 0.34 mm in the case in which the sealing method according to Comparative Example was used. In the case in which the side portions are sealed through the two-step sealing process as in Example, therefore, the length of the part of each side portion that is pushed out of the bent portion of the battery case is reduced by 0.22 mm That is, the length of the part of each side portion that is pushed out of the bent portion of the battery case is reduced by about 65%, compared to Comparative Example.

In the case in which the method of sealing the side portions of the pouch-shaped battery according to the present invention is used, as described above, it is possible to greatly reduce the length of the part of each side portion that is pushed out of the bent portion of the battery case. As a result, the overall length of the battery cell including the length of the bat ear is reduced. Consequently, the size of the battery cell is increased in proportion to the reduced length of the battery cell, whereby it is possible to increase the overall capacity of the battery cell.

Those skilled in the art to which the present invention pertains will appreciate that various applications and modifications are possible based on the above description, without departing from the scope of the present invention.

DESCRIPTION OF REFERENCE NUMERALS 100, 110: Pouch-shaped batteries
101: Positive electrode terminal
102: Negative electrode terminal
103: Insulating film
104: Electrode assembly
105: Electrode assembly reception unit
111a, 111b: Side portions
112: Primary sealing block
113: Secondary sealing block
112a, 112b: Lower end parts of side portions
113a, 113b: Secondarily sealed portions
121: Bent portion
131: Side surface of primary sealing block that faces electrode assembly reception unit
210: Sealing block used in Comparative Example
w1: Lower length of lower end part
w2: Upper length of lower end part a: Minor-axis length of secondary sealing member when viewed in plan view

INDUSTRIAL APPLICABILITY

As is apparent from the above description, a method of sealing side portions of a pouch-shaped battery according to the present invention includes a primary sealing step of sealing the lower end parts of side portions that are adjacent to a bent portion and a secondary sealing step of sealing the entireties of the side portions. Since the lower end parts of side portions are sealed first, it is possible to prevent the occurrence of a phenomenon in which a portion of the battery case is pushed out of the bent portion of the battery case as sealing is performed from above the lower end parts of side portions.

Consequently, it is possible to solve a problem in which there is a difference between the size of the battery cell measured in the case in which a portion of the battery case of the pouch-shaped battery is pushed out of the bent portion of the battery case and the actual size of the battery cell.

Furthermore, the dimensional consistency of the battery cell is improved, whereby it is possible to solve a problem in which the battery cell is measured as having a relatively large size and thus the capacity of the battery cell is reduced.

The invention claimed is:

1. A method of sealing a side portion of a pouch-shaped battery comprising an electrode current collector and a pouch-shaped battery case, the method comprising:
    bending a lower case and an upper case connected to the lower case such that the upper case faces the lower case and the electrode current collector is disposed in the lower case, the lower case and the upper case being connected to one another at a bent portion of the pouch-shaped battery case;
    a primary sealing step of sealing a lower end part of the side portion of the pouch-shaped battery case adjacent to the bent portion of the pouch-shaped battery case; and
    a secondary sealing step of sealing an entirety of the side portion of the pouch-shaped battery case.

2. The method according to claim 1, wherein the side portion is a first side portion, the primary sealing step includes simultaneously sealing the lower end part of the first side portion and a lower end part of a second side portion of the pouch-shaped battery case opposite from the first side portion, and the secondary sealing step includes simultaneously sealing entireties of the first and second side portions of the pouch-shaped battery case.

3. The method according to claim 1, wherein
    a first surface of the lower end part sealed during the primary sealing step corresponds to a boundary of a reception unit, in which the electrode current collector is mounted, and a second surface of the lower end part corresponds to an outer surface of the pouch-shaped battery case, and
    a lower end of the lower end part, which is adjacent to the bent portion, is wider than an upper end of the lower end part.

4. The method according to claim 1, wherein the primary sealing step and the secondary sealing step are performed by thermal fusion under pressure.

5. The method according to claim 3, wherein a lower length of the lower end part adjacent to the bent portion that is sealed during the primary sealing step is greater than a lower length of the side portion adjacent to the bent portion that is sealed during the secondary sealing step.

6. The method according to claim 1, wherein the pouch-shaped battery further comprises a positive electrode terminal and a negative electrode terminal that are located at an upper end part of the pouch-shaped battery case opposite to the bent portion.

7. The method according to claim 1, wherein the primary sealing step is performed using a sealing block having a planar shape corresponding to a planar shape of the lower end part.

8. The method according to claim 1, wherein the secondary sealing step is performed using a sealing block having a planar shape corresponding to a planar shape of the side portion.

9. The pouch-shaped battery sealed using the method according to claim 1.

10. The pouch-shaped battery according to claim 9, wherein a bat ear portion of the pouch-shaped battery case extending from the bent portion has a length ranging from 0.01 mm to 0.2 mm.

* * * * *